United States Patent [19]
Nakajima et al.

[11] Patent Number: 5,151,468
[45] Date of Patent: Sep. 29, 1992

[54] LOW HEAT GENERATION RUBBER COMPOSITIONS CONTAINING THIADIAZOLE COMPOUND

[75] Inventors: Ichiro Nakajima; Kazuya Hatakeyama, both of, Kodaira; Yasushi Hirata, Sayama, all of Japan

[73] Assignee: Bridgestone Corporation, Tokyo, Japan

[21] Appl. No.: 552,360

[22] Filed: Jul. 12, 1990

Related U.S. Application Data

[63] Continuation of Ser. No. 311549, Feb. 16, 1990, abandoned.

[30] Foreign Application Priority Data

Feb. 16, 1988 [JP] Japan ................................. 63-31868

[51] Int. Cl.$^5$ ............................................ C08C 19/20
[52] U.S. Cl. ................................... 525/332.7; 525/349
[58] Field of Search .................... 525/349, 332.6, 332.7

[56] References Cited

U.S. PATENT DOCUMENTS 4,288,576  9/1981  Richwine .............. 525/349
4,399,262  8/1983  Jablonski .............. 525/349
4,524,185  6/1985  Hinderer ............. 525/328.2

FOREIGN PATENT DOCUMENTS 0974915  11/1964  United Kingdom .

*Primary Examiner*—Christopher Henderson
*Attorney, Agent, or Firm*—Sughrue, Mion, Zinn, Macpeak & Seas

[57] ABSTRACT

A low heat generation type rubber composition is disclosed, which comprises at least one rubber selected from the group consisting essentially of natural rubber and a synthetic diene rubber, a reinforcing filler, and a thiadiazole compound expressed by the following general formula:

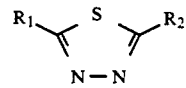

in which $R_1$ and $R_2$, which may be the same as or differ from each other, denote a mercapto group, an amino group and a trifluoromethyl group. The reinforcing filler and the thiadiazole compound are contained in amounts of 20 to 150 parts by weight and 0.1 to 10 parts by weight, respectively.

4 Claims, No Drawings

LOW HEAT GENERATION RUBBER COMPOSITIONS CONTAINING THIADIAZOLE COMPOUND

This is a continuation of application Ser. No. 07/311,549, filed Feb. 16, 1990, now abandoned.

BACKGROUND OF THE INVENTION (1) Field of the Invention

The present invention relates to low heat generation type rubber compositions.

(2) Related Art Statement

In order to cope with social demands for natural resource saving and energy saving, development of low fuel consumption tires has strenuously been made for several years in the rubber industries, particularly in the tire industry. The development of such low fuel consumption tires indispensably requires low heat generation type rubber compositions. For instance, Japanese patent application Laid-open Nos. 57-51,503, 57-55,204, and 58-36,705 describe techniques for using styrene-butadiene rubber (SBR) in which contents of bound styrene and vinyl bonds are controlled. However, those techniques could not be applied to rubbers other than SBR. Particularly, they could not be applied at all to natural rubber most widely used in heavy duty pneumatic tires.

On the other hand, Japanese Patent publication No. 50-38,131, British Pat. No. 1,185,896, U.S. Pat. No. 2,315,885, U.S. Pat. No. 2,315,856, etc. describe that heat generation characteristic of rubber compositions is improved by adding nitrosoquinolines, nitrosoanilines, etc. thereto.

However, such nitroso compounds indeed improve heat generation characteristic, but there is a problem in that particularly when they are applied in case of polyisoprene rubber, wear resistance of the rubber compositions is greatly deteriorated due to great peptizing action. Further, when the above nitroso compounds are applied in case of polyisoprene rubber, heat generation characteristic is conspicuously improved. On the other hand, when they are applied to synthetic rubbers such as styrene-butadiene copolymer rubber or polybutadiene rubber, great heat generation characteristic-improving effect cannot be expected.

SUMMARY OF THE INVENTION

It is therefore an object of the present invention to solve the above problems in that the nitroso compounds cannot be applied to natural rubber, that if they are applied to polyisoprene rubber, peptizing action is great, and that when the nitroso compounds are applied to styrene-butadiene copolymer rubber or polybutadiene rubber, great heat generation characteristic-improving effect cannot be expected, and to provide low heat generation type rubber compositions free from the above problems.

In order to accomplish the above-mentioned object, the present inventors have made strenuous examinations of heat generation improvers other than nitroso compounds, and reached the present invention.

That is, the present invention relates to a low heat generation type rubber composition comprising at least one rubber selected from the group consisting of natural rubber and a synthetic diene rubber, a reinforcing filler, and a thiadiazole compound expressed by the following general formula:

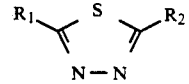

in which $R_1$ and $R_2$, which may be the same as or differ from each other, denote a mercapto group (—SH), an amino group (—NH$_2$), and a trifluoromethyl group (—CF$_3$), said reinforcing filler and said thiadiazole compound being 20 to 150 parts by weight and 0.1 to 10 parts by weight with respect to 100 parts by weight of said at least one rubber.

These and other objects, features and advantages of the invention will be appreciated upon reading of the following description of the invention, with the understanding that some modifications, variations and changes of the same could be made by the skilled person in the art to which the invention pertains without departing from the spirit of the invention or the scope of claims appended hereto.

DETAILED DESCRIPTION OF THE INVENTION

As the rubbers used in the present invention, mention may be made of natural rubber, synthetic polyisoprene rubber, styrene-butadiene copolymer rubber, polybutadiene rubber, butyl rubber, etc. may be used. These rubbers may be used singly or two or more kinds of them may be used in combination.

Thiadiazole compounds used in the present invention are mixed into the rubber compositions as heat generation improvers. As their specific examples, mention may be made of 2,5-dimercapto-1,3,4-thiadiazole, 2-amino-5-mercapto-1,3,4 thadiazole, 2-amino-5-trifluoromethyl-1,3,4-thiadiazole, etc. These thiadiazole compounds may be used singly or two or more kinds of them may be used in combination. The mixing amount of the thiadiazole compound is from 0.1 to 10 weight parts, preferably 0.25 to 2 parts by weight with respect to 100 parts by weight of the rubber component.

If the mixing amount is less than 0.1 part by weight, almost no heat generation-improving effect can be expected for the rubber composition. If it is more than 10 parts by weight, the heat generation-improving effect not only disappears, but also mechanical properties of the rubber composition are unfavorably deteriorated.

As the reinforcing filler used in the present invention, mention may be made of carbon black. The mixing amount thereof is 20 to 150 parts by weight with respect to 100 parts by weight of the rubber component. If the mixing amount is less than 20 parts by weight, the reinforced degree of the rubber composition lowers. To the contrary, if it is more than 150 parts by weight, heat generation characteristic is not only greatly damaged, but also physical properties such as wear resistance are remarkably deteriorated.

In the present invention, besides the above reinforcing filler and heat generation improvers, compounding additives used in the ordinary rubber industry, such as a softener, an antioxidant, a vulcanization accelerator, a vulcanization acceleration aid, a vulcanizer and the like may be blended, if necessary.

The rubber compositions according to the present invention may be applied to all sorts of rubber articles such as tires, conveyor belts, hoses, etc.

EXPERIMENTS

The present invention will be explained in more detail with reference to Examples and Comparative Examples.

EXAMPLES 1 TO 3 AND COMPARATIVE EXAMPLES 1 TO 3

Various rubber compositions were each prepared by mixing $5.75 \times 10^{-3}$ mole of a thiadiazole compound shown in Table 1, 100 parts by weight of natural rubber, 50 parts by weight of ISAF carbon black, 3 parts by weight of stearic acid, 1 part by weight of N-(1,3-dimethylbutyl)-N'-phenyl-p-phenylene diamine, 5 parts by weight of zinc oxide, 0.5 part by weight of N-oxydiethylene-2-benzothiazole sulfene amide, and 2.5 parts by weight of sulfur by using a Banbury mixer. With respect to the thus obtained rubber compositions, rebound resilience and sol molecular weight were evaluated. For comparison purpose, that which was added with no heat generation improver or those added with a nitroso compound were evaluated in the same manner as above. Results are shown in Table 1. Evaluation ways are as follows:

Repulsion resilience

Repulsion resilience was measured according to JIS K 6301.

Sol molecular weight:

After ar unvulcanized rubber composition was immersed in tetrahydrofurane for 48 hours, carbon gel was removed. With respect to the remaining liquid, the molecular weight (Mw) of sol was measured by using "High Speed Liquid Chromatograph HLC-802 A" manufactured by Toyo Soda Co., Ltd.

TABLE 1

| | Example | | | Comparative Example | | |
|---|---|---|---|---|---|---|
| | 1 | 2 | 3 | 1 | 2 | 3 |
| Heat generation improver | *1 2,5-dimercapto-1,3,4-thiadiazole | *2 2-amino-5-mercapto-1,3,4-thiadiazole | *3 2-amino-5-trifluoromethyl-1,3,4-thiadiazole | — | 5-nitroso-8-hydroxyquinoline | N-phenyl-p-nitrosoaniline |
| Rebound resilience (%) | 65.4 | 62.7 | 63.1 | 59.0 | 63.7 | 63.8 |
| Sol molecular weight Mw × $10^5$ | 5.56 | 5.52 | 5.49 | 5.51 | 3.97 | 2.50 |

*1, *2 are reagents manufactured by Tokyo Kasei Co., Ltd.
*3 is a reagent manufactured by Aldrich Co., Ltd.

From Table 1, it is clear that the rubber compositions according to the present invention have no peptizing action for the polymer, and have remarkably improved heat generation characteristic.

EXAMPLES 4 TO 6 AND COMPARATIVE EXAMPLES 4 TO 6

Various rubber compositions were each prepared by mixing $5.75 \times 10^{-3}$ mole of a thiadiazole compound shown in Table 1 into 137.5 parts by weight of styrene-butadiene copolymer rubber (SBR1712), 65 parts by weight of ISAF carbon black, 1 part by weight of stearic acid, 3 parts by weight of zinc oxide, 0.5 part by weight of 1,3-diphenyl guanidine, 1.0 part by weight of dibenzothiazyl disulfide and 1.5 parts by weight of sulfur by using a Banbury mixer. For comparison purpose, that which was added with no heat generation characteristic improver or those added with a nitroso compound were evaluated in the same manner as above. Results are shown in Table 2.

TABLE 2

| | Example | | | Comparative Example | | |
|---|---|---|---|---|---|---|
| | 4 | 5 | 6 | 4 | 5 | 6 |
| Heat generation improver | 2,5-dimercapto-1,3,4-thiadiazole | 2-amino-5-mercapto-1,3,4-thiadiazole | 2-amino-5-trifluoromethyl-1,3,4-thiadiazole | — | 5-nitroso-8-hydroxyquinoline | N-phenyl-p-nitrosoaniline |
| Rebound resilience (%) | 45.1 | 43.8 | 44.6 | 40.3 | 41.9 | 41.5 |

As is clear from Table 2, the styrene-butadiene copolymer rubber compositions according to the present invention have far more excellent heat generation-improving effect as compared with Comparative Examples added with the nitroso compound.

As explained above, and as is clear from the results in Examples, the rubber compositions of the present invention in which the reinforcing filler and the specific thiadizole compound are added to the rubber compound in respectively specified amounts have better heat generation-improving effect and improved polymer peptizing effects as compared with Comparative Examples added with the nitroso compounds. Thus, the rubber compositions according to the present invention have extremely great use values in a wide field as low heat generation type rubber compositions.

What is claimed is:

1. A low heat generation type rubber composition consisting essentially of at least one rubber selected from the group consisting essentially of natural rubber, synthetic polyisoprene rubber, styrene-butadiene copolymer rubber, polybutadiene rubber, and butyl rubber, a reinforcing filler, and a thiadiazole compound expressed by the following general formula:

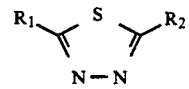

in which $R_1$ and $R_2$, which may be the same as or differ from each other, denote a mercapto group, an amino group, and a trifluoromethyl group, said reinforcing filler and said thiadiazole compound being 20 to 150 parts by weight and 0.1 to 10 parts by weight with respect to 100 parts by weight of said at least one rubber, respectively.

2. The low heat generation type rubber composition according to claim 1, wherein said thiadiazole compound is at least one compound selected from the group consisting essentially of 2,5-dimercapto-1,3,4- thiadiazole, 2-amino-5-mercapto-1,3,4-thiadiazole, and 2-amino-5-trifluoromethyl-1,3,4-thiadiazole.

3. The low heat generation type rubber composition according to claim 1, which comprises 0.25 to 2 parts by weight of said thiadiazole compound.

4. The low heat generation type rubber composition according to claim 1, wherein the reinforcing filler is carbon black.

* * * * *